Sept. 10, 1929.        G. M. SOULE        1,727,417
MATERIAL TREATING MACHINE
Filed Jan. 6, 1928
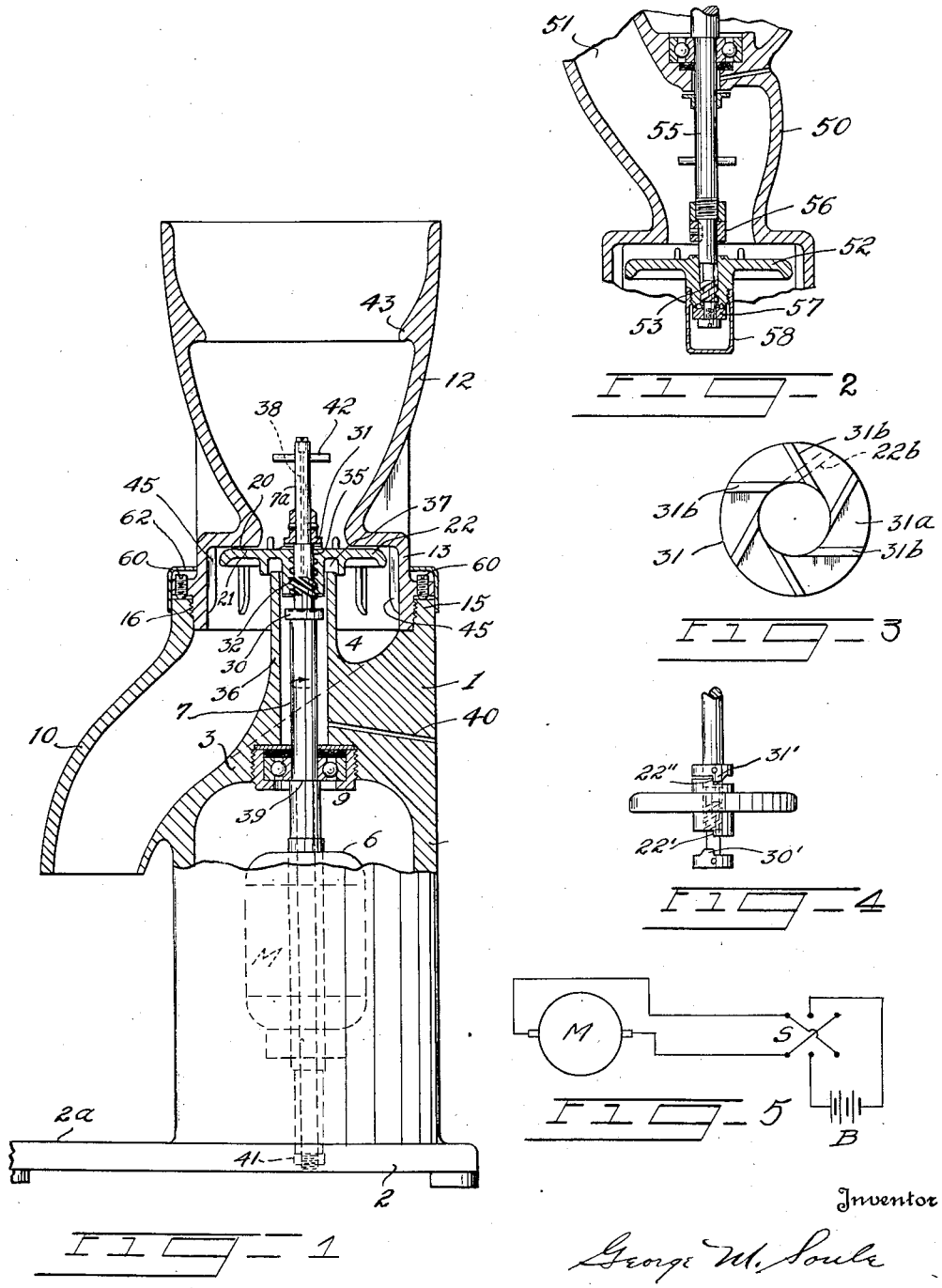
Inventor
George M. Soule
By Bates, Macklin, Goldrick & Teare
Attorneys Patented Sept. 10, 1929.

1,727,417

UNITED STATES PATENT OFFICE.

GEORGE M. SOULE, OF CLEVELAND, OHIO, ASSIGNOR TO THE DOMESTIC ELECTRIC COMPANY, OF CLEVELAND, OHIO, A CORPORATION OF OHIO.

MATERIAL-TREATING MACHINE.

Application filed January 6, 1928. Serial No. 244,824.

This invention relates to a material treating machine, and particularly to a machine suitable for converting a conglomerate mixture of liquids and soluble solids or a mixture of different liquids into a homogeneous liquid mass.

It has been found that when two comparatively smooth closely adjacent, though non-contacting surfaces are moved as by rotating past each other, at very high velocity, an imperfect mixture of different liquids and soluble solids supplied between such surfaces may be quickly reduced to a uniform liquid solution irrespective of the lack of natural affinity between the different ingredients to be mixed.

In the use of a machine adapted for mixing drinks, or for use as a household appliance, one of the problems that has arisen is to scavenge the machine of material such as fruit pulp, seeds or the like, which by reason of their indissolubility will not pass between the closely positioned surfaces. As an example of the previous practice, one method is to remove the rotor from its driving shaft to thereby separate the surfaces and to allow the indissoluble material to pass through the machine; a sufficient amount of cleansing fluid being of course placed in the machine to flush out the indissoluble material.

The machine shown in the drawings is primarily designed to facilitate this cleansing operation, and the primary object is to provide a machine in which the necessary adjustment to separate the material treating surfaces may be accomplished automatically by controlling the rotor driving means.

The machine as shown comprises a suitable tubular casing formed to provide an inlet opening at one end and a discharge opening at the other. The stator surface is supported by a part of the casing and the rotor surface by a shaft projecting into the casing. Automatic axial variation of the position of the rotor to separate the surfaces is accomplished in the embodiment shown by the use of a helical connection between the rotor and shaft and preferably by the use of a reversing motor and pole changing switch.

A specific object is to provide an abutment device which may be so arranged as to overcome the tendency of the rotor abutment to adhere to the abutment of the shaft.

Further objects and features of the invention will become apparent from the following description which relates to the accompanying drawing wherein are shown the preferred forms. The essential novel characteristics are summarized in the claims.

In the drawing Fig. 1 is a side elevation of a machine embodying the invention and adapted to serve as a drink mixer, the upper portion being broken away in substantially central cross section; Fig. 2 is a similar fragmentary view showing a modified form; Fig. 3 is a plan view of one form of abutment stop; Fig. 4 shows a rotor and shaft with a different form of stop, and Fig. 5 is a motor control electrical diagram.

Referring in detail to the drawing, 1 indicates a suitable support or housing shown as comprising a tubular casting having an inclined transverse wall 3 and upwardly and downwardly facing hollow portions 4 and 5 respectively, separated by the transverse wall. The lower casing portion 5 is adapted to receive and support an electric motor M, the armature of which is shown at 6, the shaft 7 extending through the transverse wall 3 into the hollow portion 4 hereinafter termed the discharge chamber. The shaft may be suitably supported in bearings one of which is shown at 9. The lower or base portion 2 of the casting 1 may be extended outwardly as at 2ª at the bottom to form a support for a receiving receptacle. The casing portion 4 has a laterally extending discharge spout 10 extending over the base portion 2ª.

Surmounting the casting 1 and removably secured thereto is a material receiving chamber member 12 having a generous opening at the top and having an annular member 13 at the bottom in telescoping engagement with the upper or brim portion 15 of the discharge chamber portion 4. The portions 13 and 15 overlap considerably, to prevent leakage, and these two portions may be threaded together as at 16. The member 12 as shown supports the "stator" surface 20 forming one of the essential material treating elements of the machine. This surface is shown as substantially planular. The "rotor" surface 21 is supported on a rotor member 22 carried near the upper end of the shaft 7. The rotor and stator surfaces are shown, in Fig. 1, in active position. The gap between the surfaces is exaggerated for the purpose of illustration.

The preferred means for causing separation of the surfaces a substantial distance in order that material retained in the receiving chamber may be dislodged downwardly and the whole interior of the machine cleaned, comprises mounting the rotor between a pair of stops such as 30 and 31 on the shaft, as by a steep pitch coarse square threaded connection 32. With the threads inclined in the direction shown, and assuming the rotor is resting against the stop 30, the initial rotation of the shaft in the direction of the arrow will cause the rotor (by reason of its inertia) to be raised against the stop 31. Friction by reason of the medium of air between the rotor and stator surfaces will afterward (as long as this rotation continues) hold the rotor in raised position, without depending on any jamming of the rotor against the stop. The shoulders on the stop and rotor may therefore be considerably relieved as by reason of recesses 31$^a$ (Fig. 3) between ribs 31$^b$ which latter provide the abutment surfaces. As shown in Fig. 3 the ribs on the member 31 may be tangentially arranged and cross the cooperating stop ribs on the rotor, the position of one being shown in broken lines at 22$^b$. This arrangement reduces the tendency of the rotor and stop to adhere to each other by cohesion.

A different arrangement for accomplishing substantially the same purpose is shown in Fig. 4, wherein the stops 30′ and 31′ present substantially radially arranged abutment surfaces, preferably two or more on each stop, diametrically disposed. The rotor has cooperating stops 22′ and 22″ similarly arranged as to surfaces.

The threaded connection 32 (Fig. 1), is so arranged that it is protected against fouling by the material to be treated. The internal threads on the rotor stop short of the top surface of the rotor and the shaft is cylindrical above the external threads, wherefore the plain sliding engagement between the shaft and rotor at 35 is maintained whether the rotor is raised or lowered. Material in the discharged chamber is prevented from reaching the threaded connection by means of a tube 36 surrounding the shaft, the upper end of the tube being at all times at least slightly within a recess 37 on the lower side of the rotor. Reference is directed to my copending application Serial No. 197,301 filed June 8, 1927, for a similar arrangement of shrouding the rotating parts below the rotor against entrance of material thereto from the discharge chamber, and the arrangement including an air inlet such as 40 for supplying air to the space between the shaft and tube. Lubricant may be occasionally supplied to the threads through a hole drilled in the shaft as at 38. The stop 30 may be rigid on the shaft 7 by reason of making the shaft in two parts, one inside the other, the outer part terminating at 39 at the top to provide a shoulder against the bearing 9. The two parts may be clamped together as by a nut 41 at the bottom end of the shaft. The stop 31 as shown in Fig. 1 is pinned on the shaft.

The material to be treated may be subjected to a preliminary disintegrating and agitating process within the chamber 12 by reason of projections 42 carried by an upward extension 7$^a$ of the shaft 7. The material while so acted on is whirled rapidly and to prevent the material from climbing out of the receiving chamber, I may provide ribs 43 curving inwardly on their lower surfaces to direct the material inwardly toward the center of the chamber where it will again fall by gravity toward the rotor. Feeding of the material is accomplished by gravity aided by the sucking action of the relatively rapidly rotating surfaces 20 and 21. As the material is thrown outwardly between the surfaces it may be subjected to the action of ribs 45 formed on the interior of the member 13 which counteract the whirling condition of the material and cause it to flow straight downwardly toward the steeply sloping partition 3, the latter directing the material toward the discharge spout.

The rotor may be caused to be lowered simply by abruptly stopping the shaft, as by means of a friction brake (not shown). The preferred method is to reverse the motor M as by a pole reversing switch S, conventionally shown in Fig. 5, the source of power being indicated at B. The motor may be left running in the reverse direction to facilitate the cleansing operation. Cleaning may then be done by a simple flushing process, the projections 42 and the rotor acting on the cleansing fluid to agitate and feed it through the machine.

Fine adjustment with respect to the rotor and stator surfaces in the form shown in Fig. 1 is had by reason of the threaded connection 16 between the member 13 and the main casing or support. When once properly adjusted as to distance the member 13 may be locked in place by the use of a series of set screws 60 threaded into a flange on the member 13 and bearing against the brim of the portion 15. The set screws may be used to take up all loose play in the threads 16, as well as to slightly vary the distance at any given side of the rotor between the rotor and stator surfaces. The heads of the screws may be shrouded to prevent unauthorized tampering as by an annular guard member 62.

In the form of machine shown in Fig. 2 the motor (not shown) is supported above a main supporting casing 50 having a material receiving channel 51. The rotor 52 is mounted on coarse threads 53 at the lower end of the motor shaft 55. The upper stop 56 is shown, adjustable with reference to the shaft in a known manner, the lower stop 57 being rigidly mounted on the end of the shaft. The threaded connection may be lubricated from a cap member 58 threaded on the hub of the rotor and forming a reservoir as well as a guard cap.

I claim:—

1. In a machine of the class described, a rotor having a material treating surface, means providing a stator surface arranged to operate in close non-contacting relation to the rotor surface, means for supplying material to be treated to the said surfaces, means for driving the rotor and a freely operable helical guiding connection between the rotor and driving means providing for axial relative movement between these elements, whereby when the driving means is rotated in a given direction, the connection is affected to axially move the rotor to a predetermined position.

2. In a machine of the character described, a tubular housing, means providing a stator surface located in the housing intermediate the ends thereof, a rotor having a surface in close non-contacting relation to the stator surface, a reversible motor having a freely operable helical guiding driving connection with the rotor, whereby, when the motor is rotated in one direction, the said surfaces are brought toward each other and when reversed the surfaces are separated.

3. In a machine for treating liquid and solid materials, a housing, a circular stationary material treating surface carried by the housing, a rotor having a coacting surface in close non-contacting relation to the stationary surface, means for driving the rotor, and means including a freely operable helical guide connection between the rotor and driving means for separating said surfaces a definite distance, said latter means being operated by a predetermined variation in the rotation of the driving means.

4. In a material treating machine of the class described, a stator surface and a rotor surface, and means for supporting such surfaces, a shaft having a steep threaded connection with the rotor surface supporting means, and a pair of stops carried by the shaft and arranged to engage the latter means at different times, there being means for controlling the rotation of the shaft to carry the rotor surface supporting means into engagement first with one stop and then the other through the threaded connection.

5. In a machine of the class described, a housing, a circular stationary material treating surface carried by the housing, a rotor having a corresponding surface in close non-contacting relation to the stationary surface, means for driving the rotor, and means including a helical guiding connection between the rotor and driving means for separating said surfaces a definite distance, said means being arranged to act on the rotor consequent upon a change in the direction of rotation of the rotor driving means.

6. In a machine of the class described, a rotor and stator having closely adjacent surfaces facing each other in an axial direction, means for supplying material between said surfaces, a shaft for driving the rotor, and having a steep pitch connection therewith, a stop carried by the shaft and having radially separated surfaces for engaging the rotor to overcome the tendency of the rotor to adhere to the stop and wherefore the rotor may be easily moved on the shaft away from said stop.

7. In a material treating machine, a rotor and stator having respective closely adjacent material treating surfaces, means for supplying material between said surfaces, a shaft for driving the rotor, the shaft having stopping members presenting radial stopping surfaces arranged to engage the rotor, and means for causing the rotor to engage one stop when the shaft is turned in one direction and to engage the other stop when the shaft is turned in the opposite direction.

In testimony whereof, I hereunto affix my signature.

GEORGE M. SOULE.